Sept. 18, 1962

M. H. WALKER ETAL 3,054,110

POWDER ACTUATED TOOL

Filed June 22, 1955

11 Sheets-Sheet 1

INVENTORS
MERLE H. WALKER
NEWTON M. REED
ROBERT T. CATLIN
BY
John H. Lewis Jr.
ATTORNEYS

POWDER ACTUATED TOOL

Filed June 22, 1955 11 Sheets-Sheet 2

INVENTORS
MERLE H. WALKER
NEWTON M. REED
ROBERT T. CATLIN
BY
John H. Lewis Jr.
ATTORNEYS

POWDER ACTUATED TOOL

Filed June 22, 1955 11 Sheets-Sheet 3

INVENTORS
MERLE H. WALKER
NEWTON M. REED
ROBERT T. CATLIN
BY
John H. Lewis Jr.
ATTORNEYS

POWDER ACTUATED TOOL

Filed June 22, 1955 11 Sheets-Sheet 4

INVENTORS
MERLE H. WALKER
NEWTON M. REED
ROBERT T. CATLIN
BY
[signature]
John H. Lewis Jr.
ATTORNEYS Sept. 18, 1962 M. H. WALKER ETAL 3,054,110

POWDER ACTUATED TOOL

Filed June 22, 1955 11 Sheets-Sheet 5

INVENTORS
MERLE H. WALKER
NEWTON M. REED
ROBERT T. CATLIN
BY
John H. Lewis Jr.
ATTORNEYS Sept. 18, 1962 M. H. WALKER ET AL 3,054,110

POWDER ACTUATED TOOL

Filed June 22, 1955 11 Sheets-Sheet 6

INVENTORS
MERLE H. WALKER
NEWTON M. REED
ROBERT T. CATLIN
BY
John H. Lewis Jr.
ATTORNEYS

POWDER ACTUATED TOOL

Filed June 22, 1955 11 Sheets-Sheet 7

INVENTORS
MERLE H. WALKER
NEWTON M. REED
BY ROBERT T. CATLIN

John H. Lewis Jr.
ATTORNEYS

Sept. 18, 1962 M. H. WALKER ETAL 3,054,110

POWDER ACTUATED TOOL

Filed June 22, 1955 11 Sheets-Sheet 8

INVENTORS
MERLE H. WALKER
NEWTON M. REED
BY ROBERT T. CATLIN

John H. Lewis Jr.
ATTORNEYS

INVENTORS
MERLE H. WALKER
NEWTON M. REED
ROBERT T. CATLIN
BY
ATTORNEYS

INVENTORS
MERLE H. WALKER
NEWTON M. REED
BY ROBERT T. CATLIN
John H. Lewis Jr.
ATTORNEYS

POWDER ACTUATED TOOL

Filed June 22, 1955 11 Sheets-Sheet 11

INVENTORS
MERLE H. WALKER
NEWTON M. REED
ROBERT T. CATLIN
BY
John H. Lewis Jr.
ATTORNEYS United States Patent Office 3,054,110

Patented Sept. 18, 1962

3,054,110

POWDER ACTUATED TOOL

Merle H. Walker, Ilion, and Newton M. Reed, Herkimer, N.Y., and Robert T. Catlin, Trumbull, Conn., assignors to Remington Arms Company, Bridgeport, Conn., a corporation of Delaware Filed June 22, 1955, Ser. No. 517,192

21 Claims. (Cl. 1—44.5)

This invention relates to powder actuated tools, and contemplates a versatile tool adapted for the driving of various sizes and shapes of fastening devices or implements with a wide variety of powder charges.

The invention will be described as applied to a tool for the driving of studs or other fastening devices. The studs to be driven are usually but not necessarily of circular cross-section. They vary substantially in size and weight, and the materials into which the studs are driven vary widely in penetrability. Thus, there are wide variations in the energy required to properly place a particular stud in a particular host material. It is desirable that the fastening device to be driven be supplied separately from the cartridge containing the stud-propelling powder charge, to enable the selection of the particular stud and the particular cartridge required for a given job.

It is further desirable to provide a tool adapted to separately receive the fastening device and the cartridge, the temporary assembly of the two for the sole purpose of placing them in the tool being difficult to handle and requiring the use of temporary holding means having no other function.

It is also advantageous to provide readily interchangeable barrels for receiving studs of different maximum diameters and/or studs of other than circular cross-section, and to provide for the use of interchangeable chamber pieces adapted to contain cartridges of varying size and energy.

The term "cartridge" as used herein is understood to mean a case, usually of metal, containing only a priming charge and a powder charge, the stud or other device to be driven being entirely separate from the cartridge.

The present invention attains the foregoing objectives by providing a tool comprising a front or barrel assembly and a rear breeching and fire control assembly, and intermediate these two assemblies a member adapted to hold a chamber piece or bushing which contains the cartridge, the three elements being integrated into a unitary structure which is susceptible to opening to provide access to both the breech end of the barrel, for stud loading, and to the chamber bushing, for cartridge case ejection and reloading, all without disassembly of the unitary structure.

The invention further contemplates a construction which enables the ready interchange of barrels and barrel accessories, all as will hereinafter more fully appear.

Figures 9, 10:
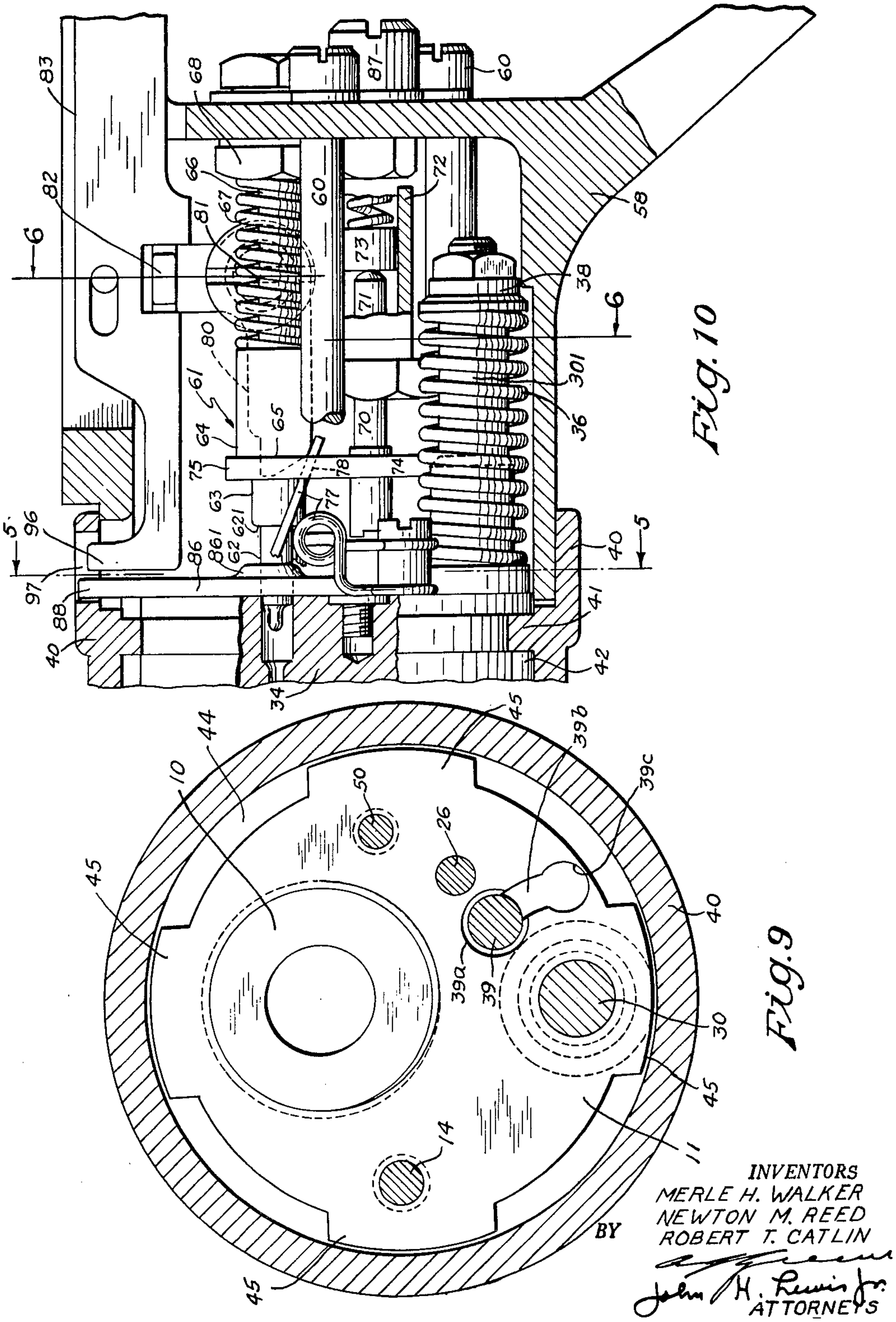
FIG. 9 is a transverse section on the line 9—9 of FIG. 3.
FIG. 10 is a vertical sectional elevation through the rear housing, showing the fire control, most other parts being omitted.
Figure 10A:
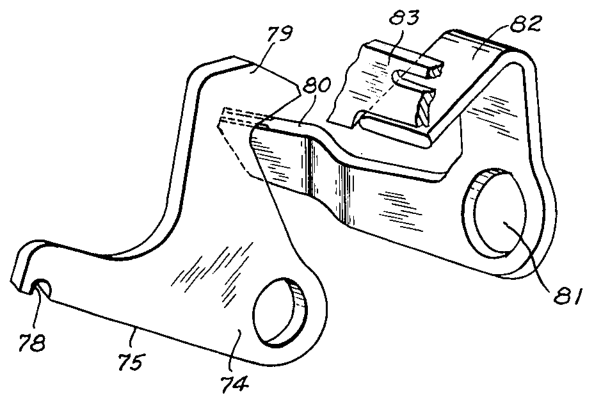

FIG. 10*a* is a perspective of a portion of the fire control mechanism.

Figure 11:
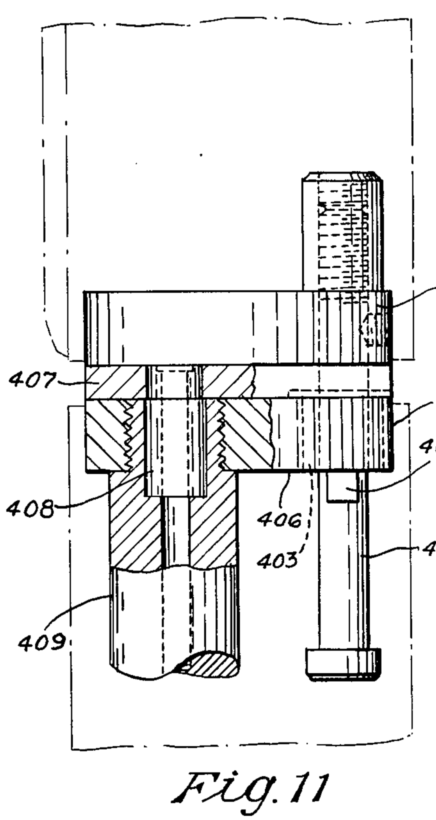
Figure 12:
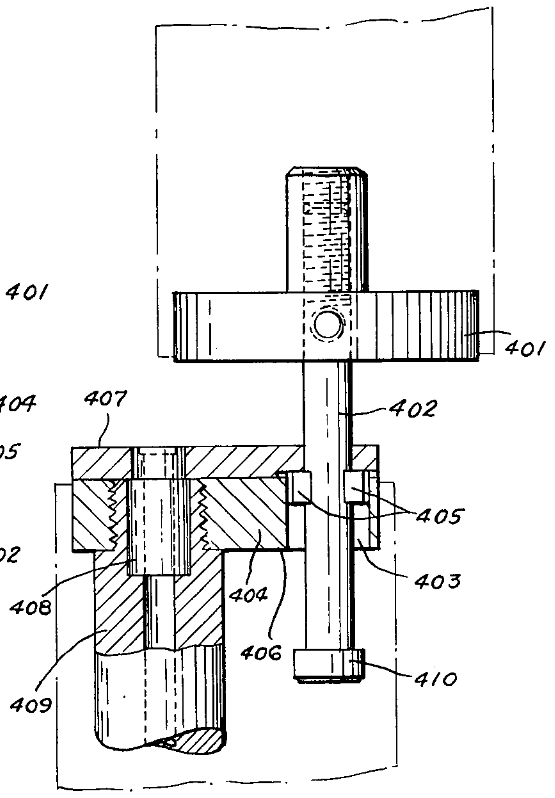
Figure 13:
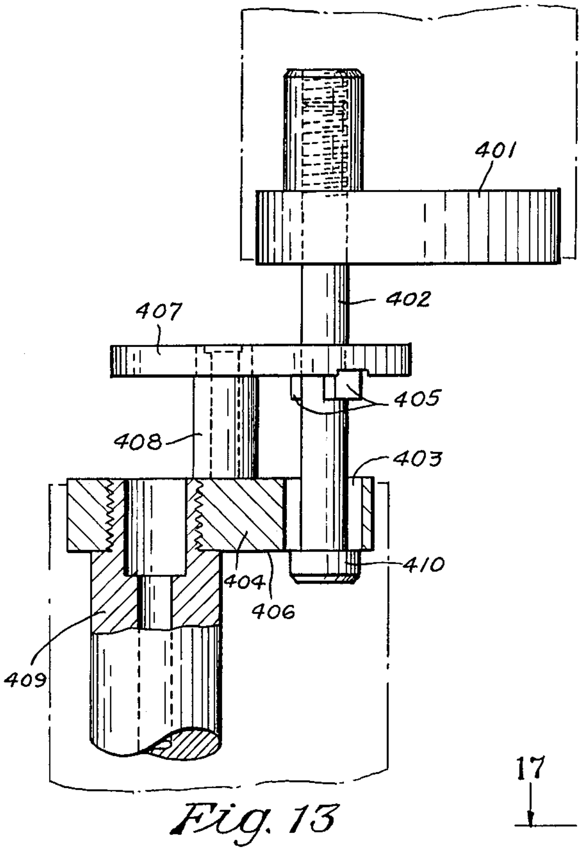

FIGS. 11, 12 and 13 show somewhat diagrammatically a modified form of breech mechanism in closed, partially closed and open position.

Figure 15:
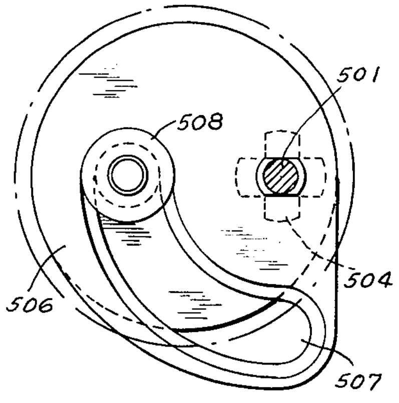
Figure 14:
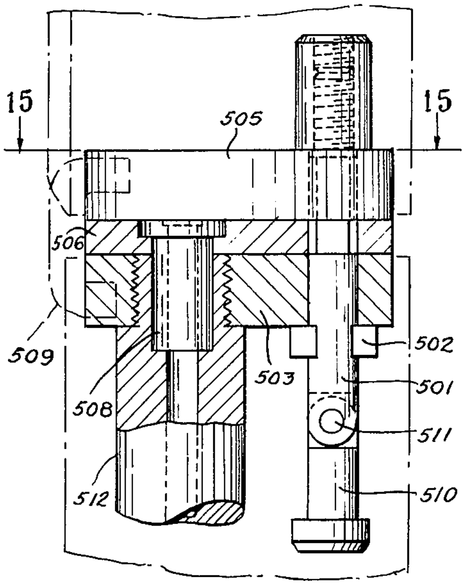
Figure 16:
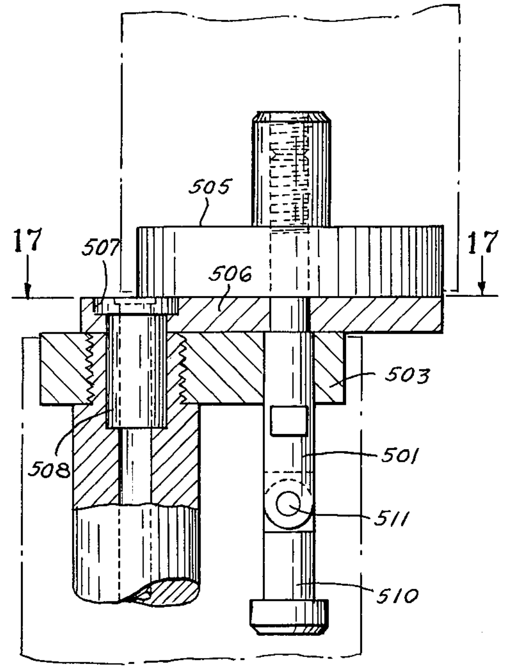
Figures 17, 18, 19, 20:
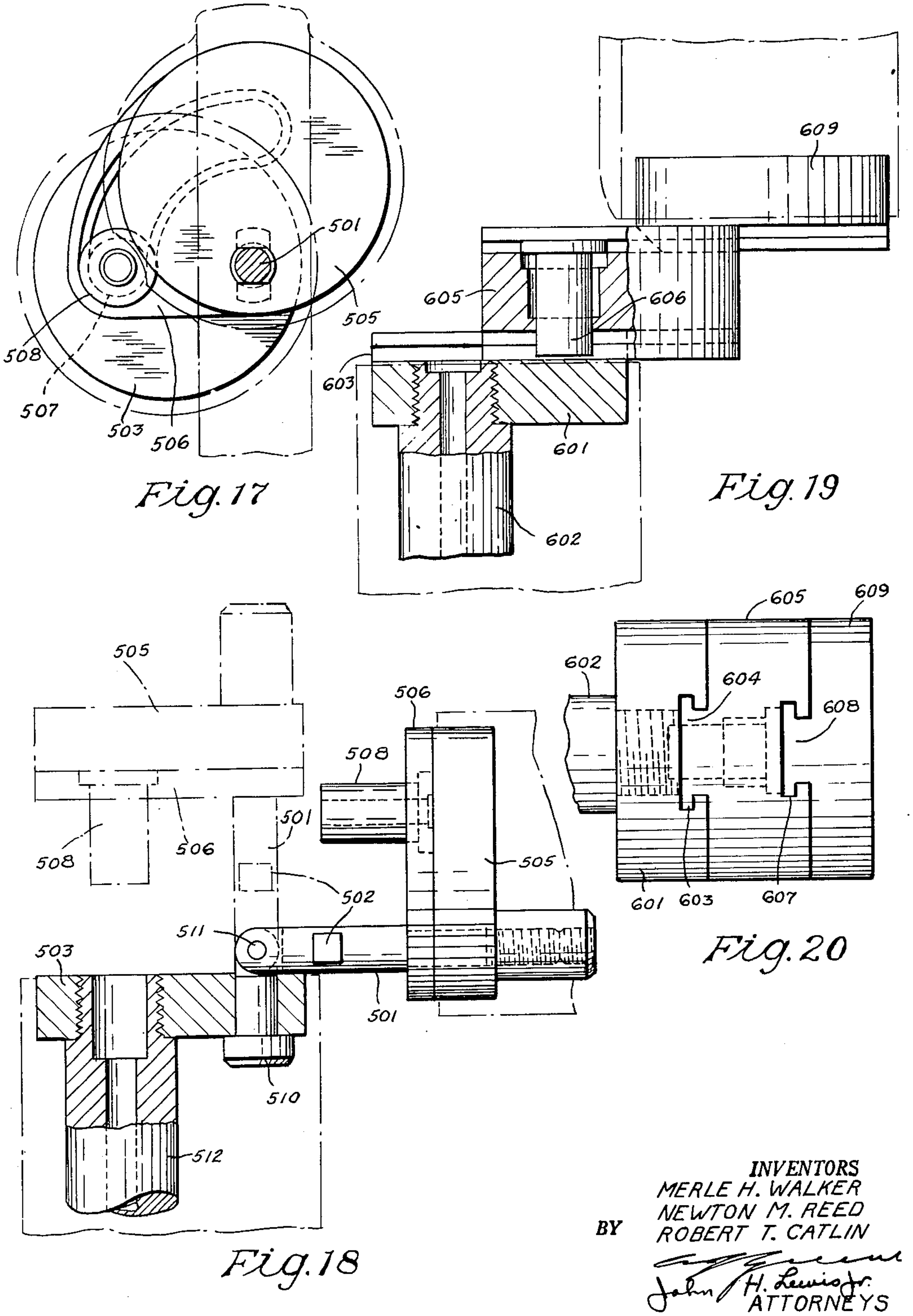

FIGS. 14 to 18 illustrate another modification of the breech mechanism. FIG. 14 is a longitudinal section of the closed action. FIG. 15 is a section on the line 15—15 of FIG. 14. FIG. 16 is a longitudinal section, showing the action unlocked and partially open. FIG. 17 is a section on the line 17—17 of FIG. 16. FIG. 18 is a longitudinal section, showing the action open.

Figures 21, 22, 23, 24:
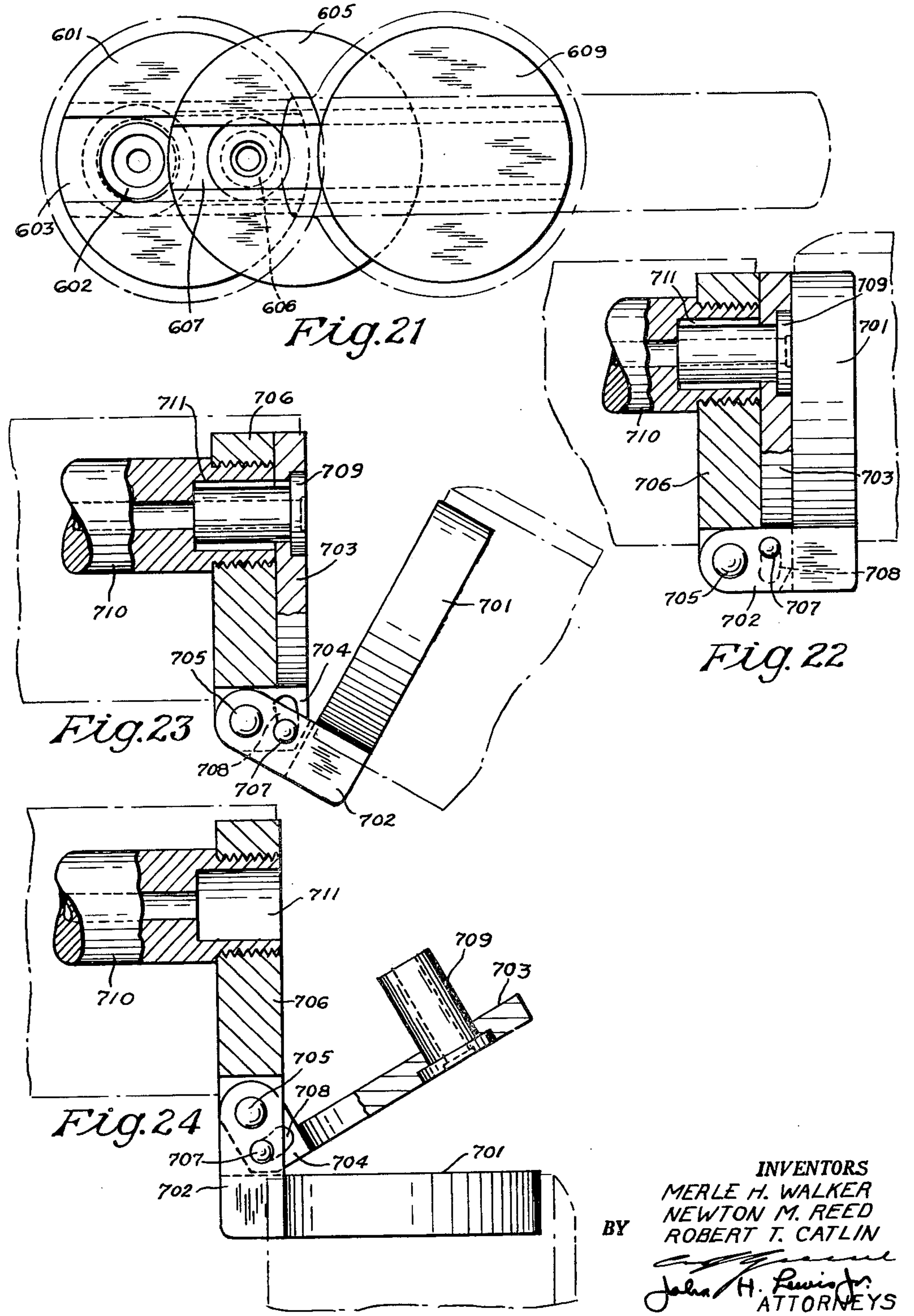

FIGS. 19 to 21, inclusive, show another modification of the breech mechanism, FIG. 19 being a partial longitudinal section, FIG. 20 a fragmentary plan view, and FIG. 21 an end view.

FIGS. 22 to 24, inclusive, show another modification of the breech mechanism, each being a partial longitudinal section. FIG. 22 shows the action closed, FIG. 23 shows it partially open, and FIG. 24 shows it fully open.

Figures 25, 26:
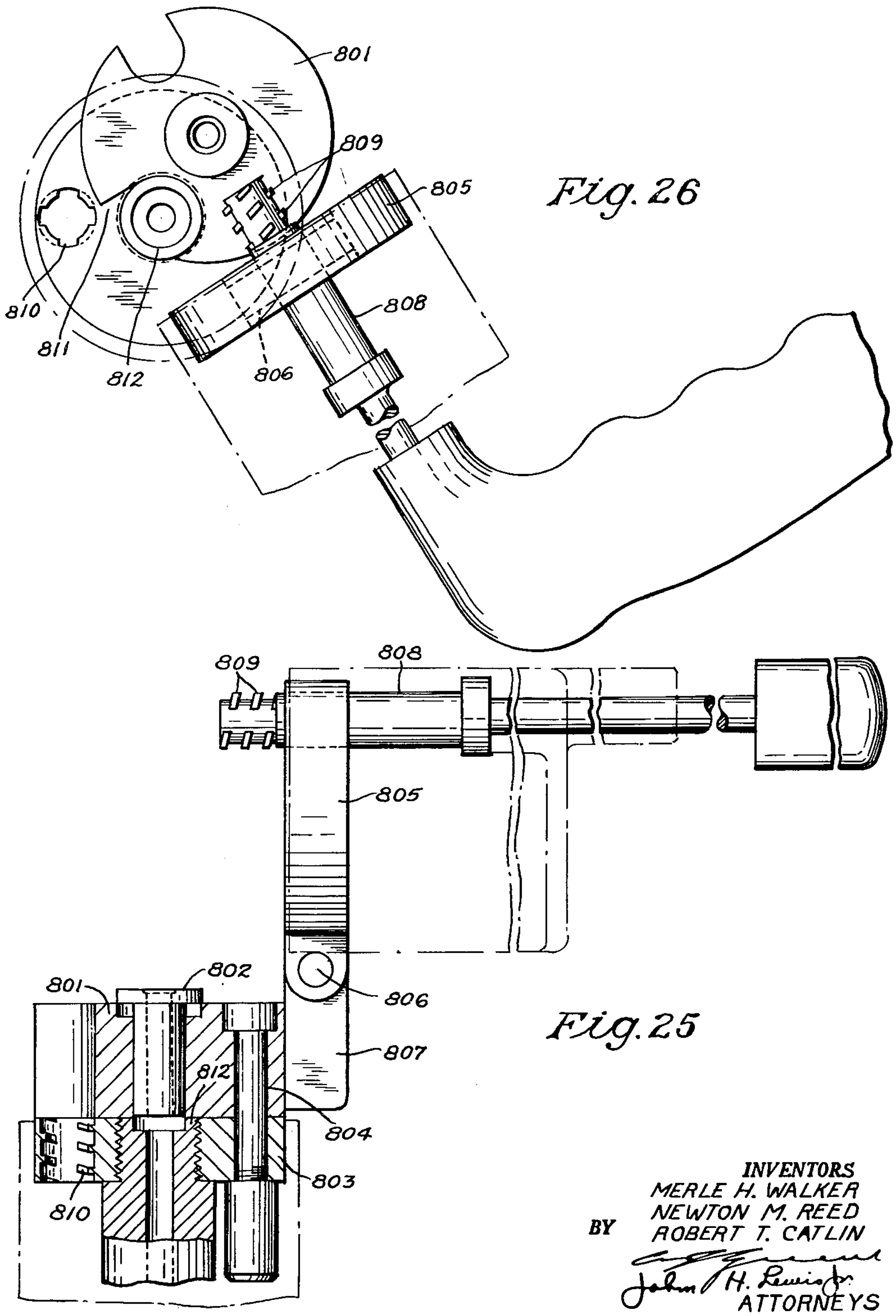

FIGS. 25 and 26 show still another modification of the breech mechanism, FIG. 25 being a partial longitudinal section, showing the action partly open, and FIG. 26 being an end view, showing the action fully open.

Figures 27, 28, 29:
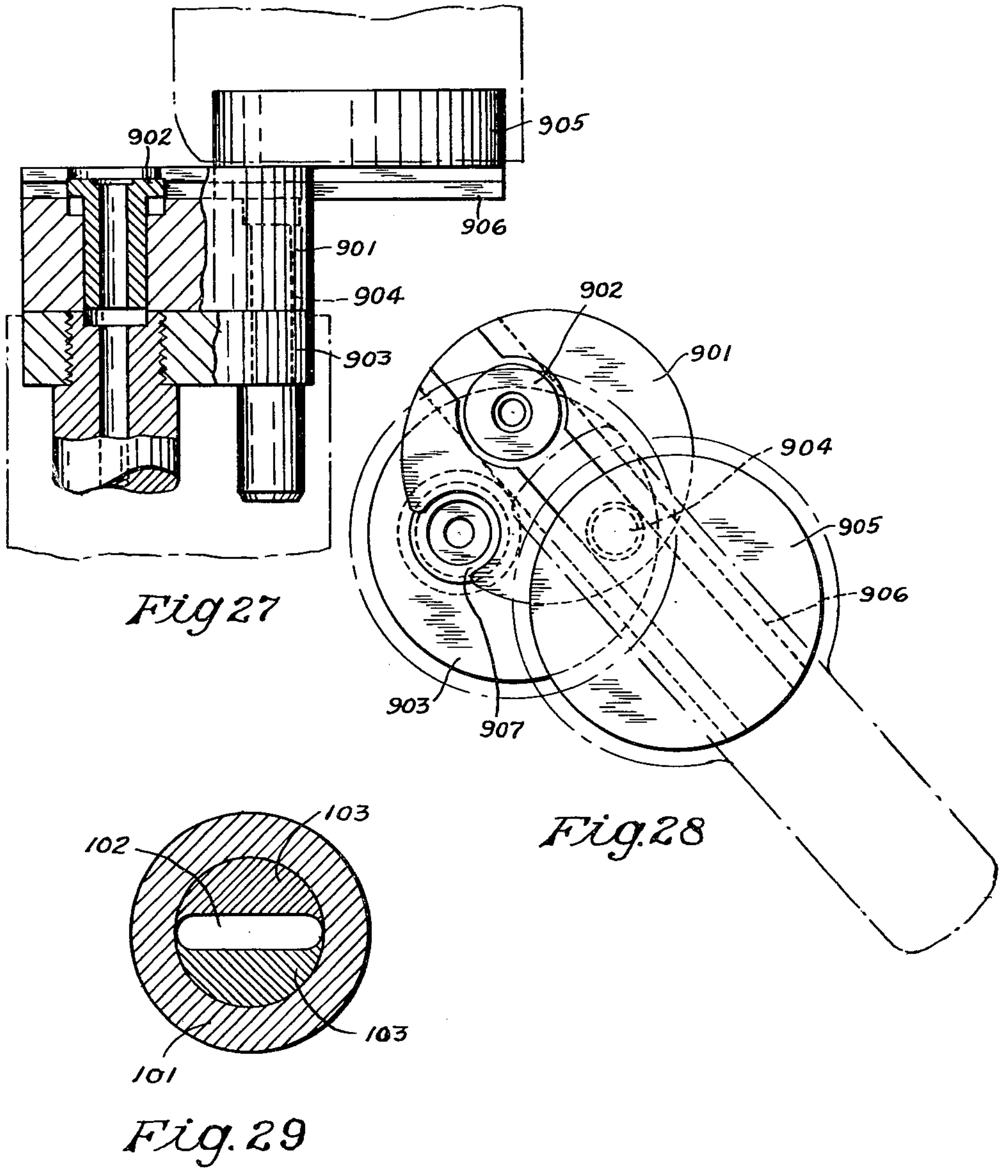

FIGS. 27 and 28 show a further modification of the breech mechanism, FIG. 27 being a partial longitudinal section, showing the action partly open, and FIG. 28 being an end view, showing the action fully open.

FIG. 29 is a detached transverse section of a barrel with a non-circular bore adapted to the driving of such fasteners as staples.

The tool comprises a barrel 10 having at its rear or breech end a threaded connection with a frame plate 11. The barrel bore is not necessarily of circular cross section. Thus, FIG. 29 illustrates barrel 101 having a bore 102 in the form of a rectangle with slightly rounded ends adapted for the driving of staples. Such a barrel may be made from a conventional barrel having a cylindrical bore by securing therein filler pieces 103 having planar faces defining the slot-like bore and arcuate faces fitting against the periphery of the circular bore in which they are placed. Barrels may be exchanged by the simple act of unscrewing the threaded connection between barrel and frame plate and threading in a different barrel. The barrel, frame plate and parts supported thereby (to be described) constitute the forward or barrel assembly.

A cover 12 (FIGS. 1, 2 and 3) of cylindrical configuration surrounds the rear portion of the barrel and houses certain mechanism to be described. The rearward end of cover 12 is open and abuts the face of frame plate 11. The forward end of cover 12 is closed and apertured to receive the barrel 10 and a sleeve 13 which surrounds the barrel and moves longitudinally relative thereto. The cover 12 is secured to frame plate 11 by suitable means such as bolts 14 (FIG. 3) which pass through apertures in the end 121 of the cover and are received in threaded apertures in the frame plate 11. Barrel sleeve 13 may carry a guard 15 and/or a muffler 16 of any desired construction, the assembly of guard and muffler being urged forwardly on the sleeve by suitable means such as a spring 17 surrounding the sleeve and abutting a plate 18 at the end of the cover 12.

Figure 1:
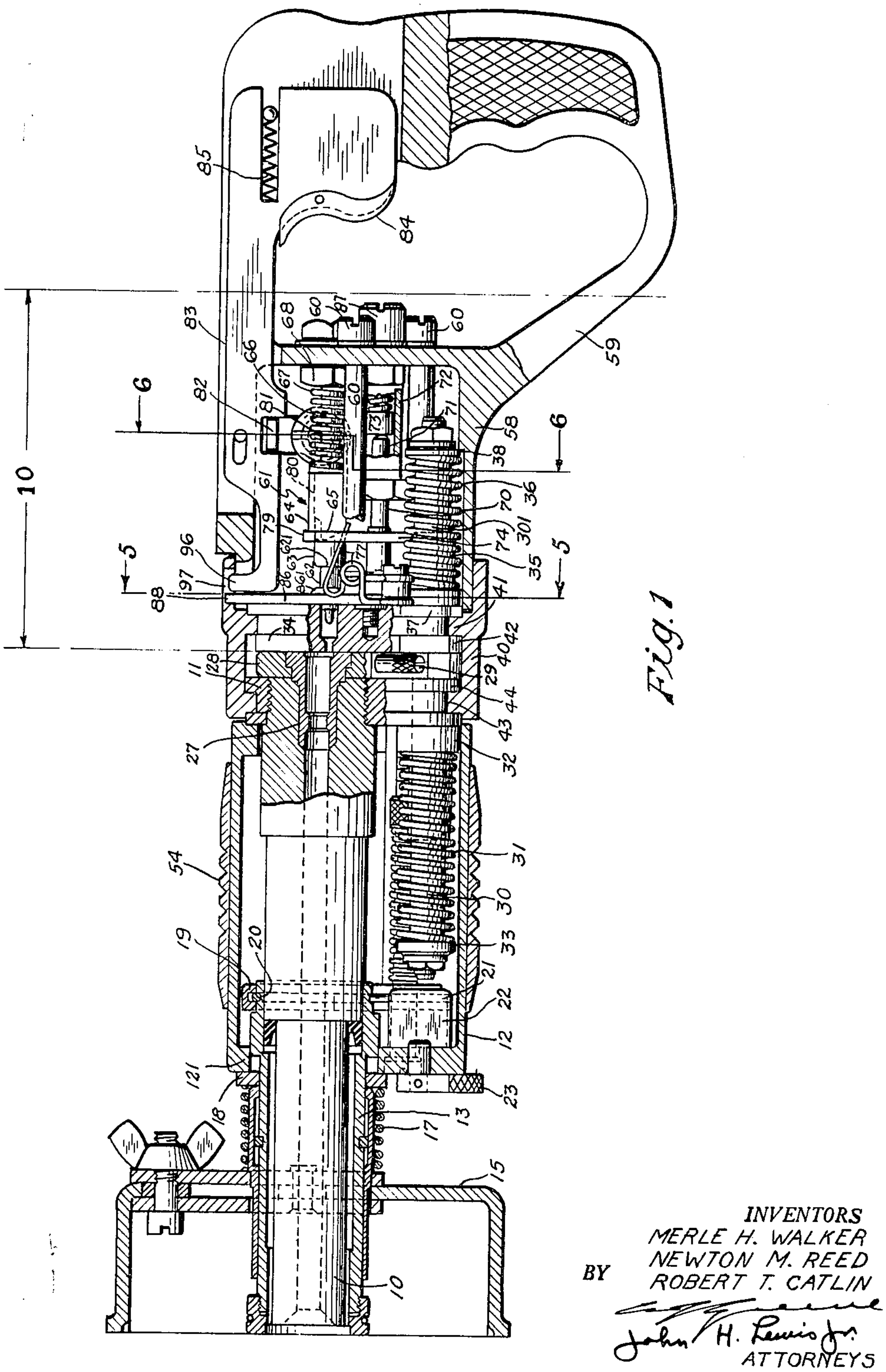
FIG. 1 is a side elevation, mostly in section, of a tool embodying one form of the present invention, the breech being closed and the tool in firing position, the guard barrel sleeve and associated parts being retracted relative to the barrel to unlock the firing mechanism.
Figure 2:
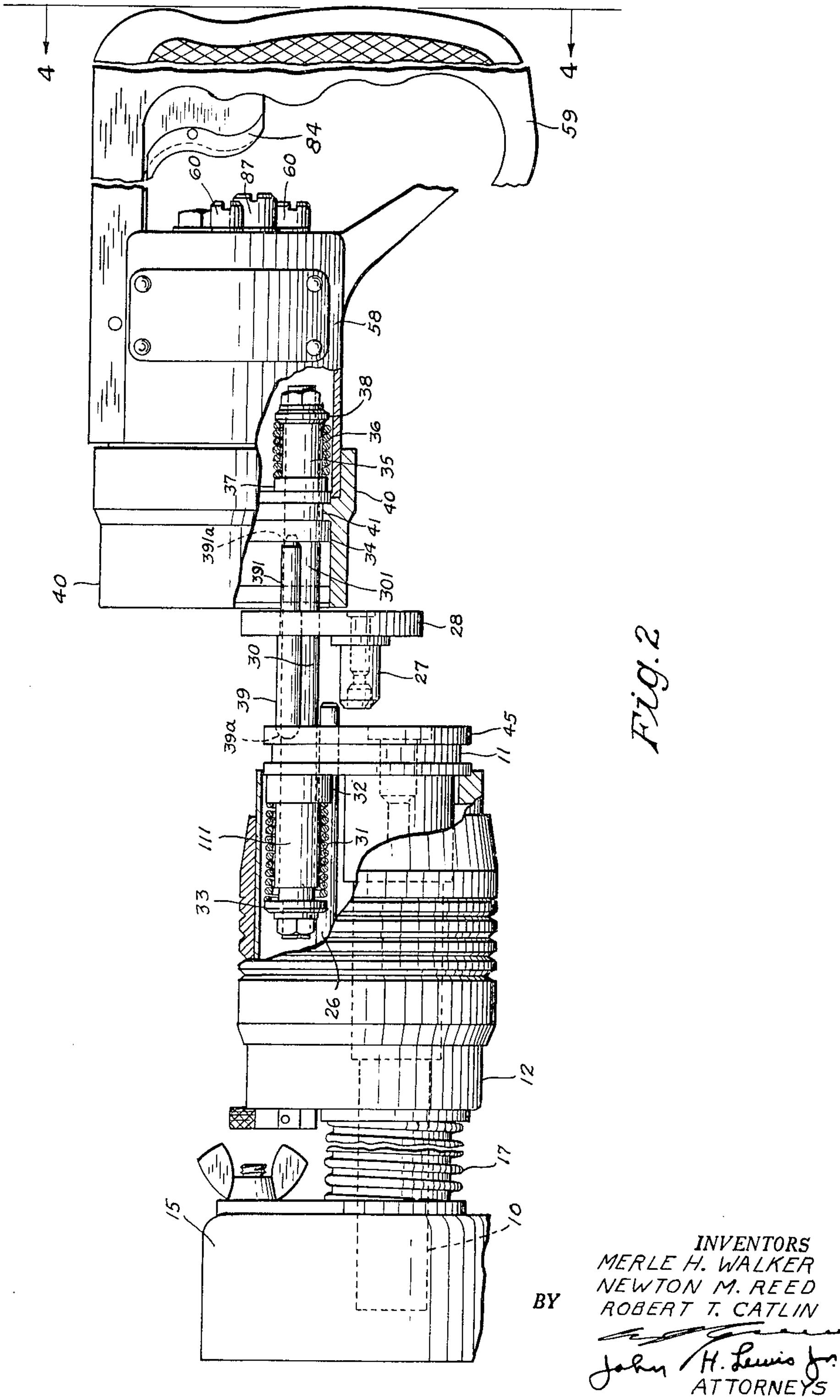
FIG. 2 is an elevation, partly in section, showing the tool open for fired case ejection and reloading.
Figures 3, 4, 5, 6:
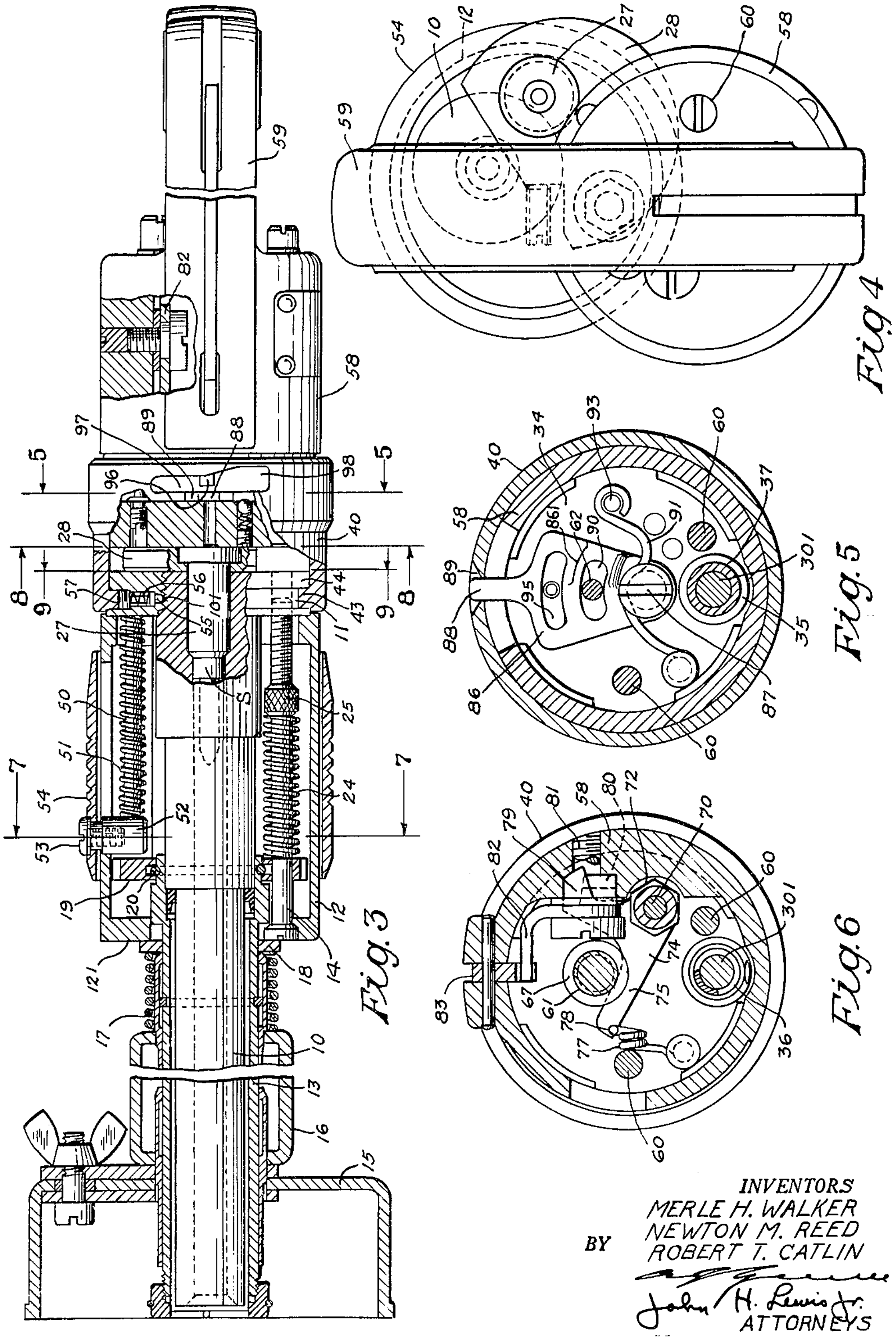
FIG. 3 is a plan view, partly in section, of a tool which is identical with the tool shown in FIGS. 1 and 2 except that it is provided with a chamber bushing and a barrel adapted to the handling of larger studs and cartridges of greater power.
FIG. 4 is an end view of the opened tool, looking in the direction indicated on FIG. 2.
FIG. 5 is a transverse section on the line 5—5 of FIGS. 1, 3, and 10.
FIG. 6 is a transverse action on the line 6—6 of FIG. 1 and line 6—6 of FIG. 10.
Figure 8:
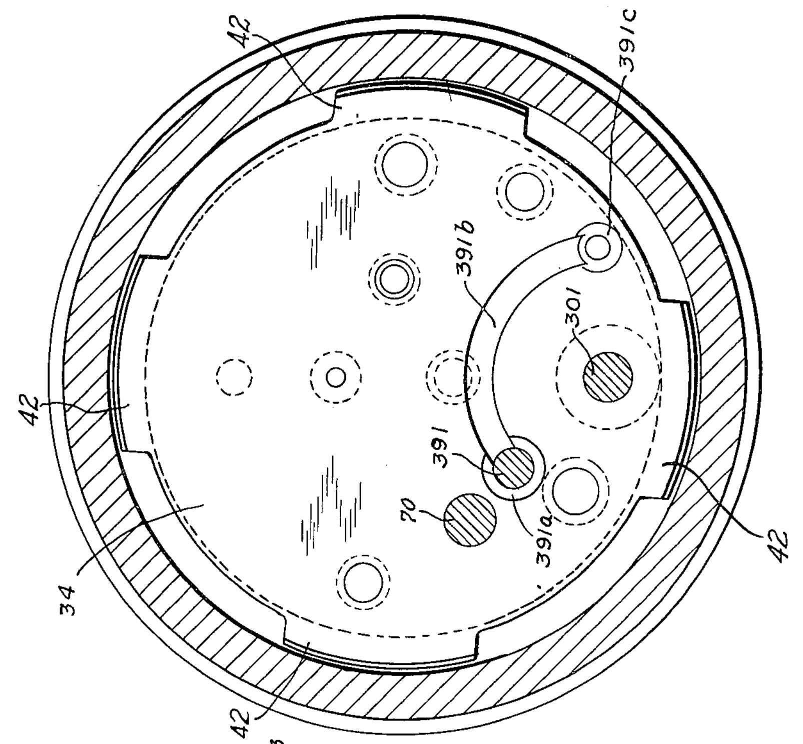
FIG. 8 is a transverse section on the line 8—8 of FIG. 3.
Figure 7:
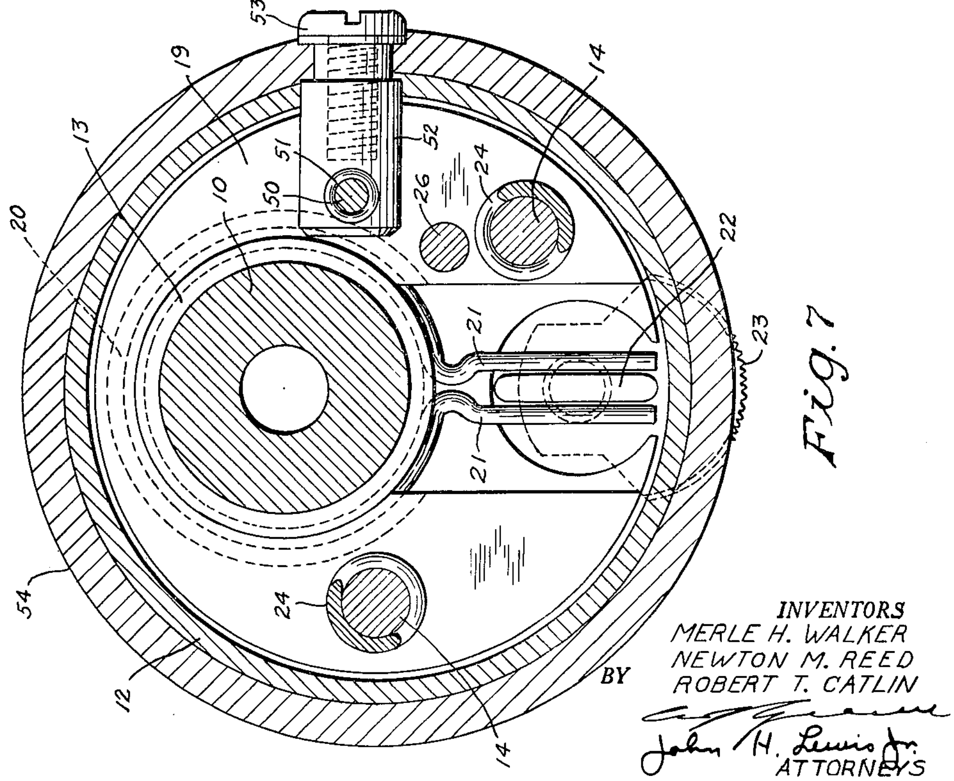
FIG. 7 is a transverse section on the line 7—7 of FIG. 3.

Within the cover 12 the rearward end of barrel sleeve 13 is joined to an action plate 19. The invention contemplates the use of interchangeable barrel sleeve and guard assemblies. Such interchange may be merely for the purpose of enabling the use of special purpose guards or it may be associated with the interchange of barrels and chamber bushings. FIGS. 1 and 2 show a light duty tool provided with a relatively short barrel, while FIG. 3 illustrates a heavy duty tool provided with a longer barrel and a proportionately longer barrel sleeve and muffler 16. To provide interchangeability of barrel sleeve assemblies, the rearward end of barrel sleeve 13 may be received in an aperture in action plate 19, and the two members provided with matching annular recesses which receive a yoke or "snap ring" 20 of spring metal. When unstressed, the snap ring occupies portions of the matching recesses and thus joins the barrel sleeve and the action plate. The snap ring is preferably provided with out-turned legs 21 (FIG. 7) which straddle a cam 22 adapted to be rotated by a fingerpiece 23 to spread the snap ring and permit the removal of the barrel sleeve. This quick release feature of the barrel sleeve assemblies forms the subject of the copending application of Catlin and Landa, Serial Number 553,475, filed December 16, 1955, and entitled "Safety Shield for Explosively-Operated Tool," now Patent No. 2,873,446, dated February 17, 1959.

Action plate 19 is urged forwardly by suitable means such as springs 24 (FIG. 3) which, as illustrated, utilize the cover bolts 14 as pilots, spring abutments 25 being threaded onto said bolts. Rigidly secured to and extending rearwardly from action plate 19 is an action bar 26 (FIG. 2) which has a fire controlling function to be described. For the present, it is sufficient to say that the construction is such that the tool cannot be fired unless it is firmly pressed against a solid surface, thus moving the barrel sleeve, action plate and action bar rearwardly relative to the barrel. The proportioning of parts is such that the barrel must be in close proximity to the work surface to enable firing.

The rearward or breech end of barrel 10 (FIG. 2) is counterbored to receive the body portion of a chamber bushing 27 which preferably comprises both a cartridge holding chamber and a combustion controlling chamber, as more fully described in the co-pending application of Catlin et al., Serial No. 517,524, filed June 23, 1955, now Patent Number 2,759,185, granted August 21, 1956. Said chamber bushing is carried in and may project forwardly from a chamber plate 28, being held in an aperture in such plate by suitable means such as a set screw 29 (FIG. 1). The engagement of screw 29 with the bushing is such as to enable a limited longitudinal movement of the bushing. Thus, when a cartridge is fired in the chamber provided by the bushing, the bushing is enabled a rearward movement sufficient to bring the head of the cartridge therein and the end face of the bushing into firm engagement with a breech block or plate 34, to be described.

Means are provided for supporting and holding the frame plate 11, chamber 28 and breech plate 34 as an assembled and unitary structure while permitting such relative displacement of these elements as to give access to both the chamber bushing and the breech end of the barrel. This can be accomplished in several ways, such as relative transverse displacement without relative rotation or longitudinal displacement (FIGS. 19–21), relative rotation about a transverse pivot 705 without longitudinal movement (FIGS. 22–24), relative rotation about one longitudinal pivot 402 with longitudinal movement (FIGS. 11–13), relative rotation about one transverse pivot 511 and one longitudinal pivot 501 with longitudinal movement (FIGS. 14–18), relative rotation about one longitudinal pivot 808 and one transverse pivot 806 without longitudinal movement (FIGS. 25–26), relative rotation about a longitudinal pivot 904 with transverse movement (FIGS. 27–28). In the preferred embodiment shown in FIGS. 1–9, inclusive, the construction is such that the chamber plate 28 with the bushing 27 therein is retracted longitudinally until the bushing 27 clears the end of the barrel 10 and is then swung transversely to an ejecting and loading position, as shown in FIG. 2. The breech plate is so arranged that it can be further retracted with respect to the chamber plate and further rotated transversely to clear the chamber bushing. Means are also provided for locking the breech plate and the frame plate together with the chamber plate between them when these elements are aligned as shown in FIGS. 1 and 3. The construction is as follows:

The chamber plate 28 is rigidly secured to the midportion of a hinge pin (FIGS. 1 and 2) which comprises a forwardly extending part 30 and a rearwardly extending part 301. The forward portion 30 is received in an aperture in frame plate 11 and a boss 111 extending forwardly therefrom, the pin being urged forwardly with respect to the frame plate by suitable means such as a spring 31 surrounding the pin and the boss 111 and compressed between a collar 32 associated with the boss and an abutment 33 on the pin. The rearward portion 301 of the hinge pin is received in an aperture in a breech block or plate 34 and a boss 35 extending rearwardly therefrom, the pin being urged rearwardly with respect to breech plate 34 by suitable means such as a spring 36 compressed between a collar 37 associated with the breech plate and an abutment 38 on the pin. Chamber plate 28 is also provided with aligned detent pins 39 and 391 extending forwardly and rearwardly therefrom and normally received in aligned apertures 39*a* and 391*a* in frame plate 11 and breech plate 34 respectively.

Surrounding the breech plate 34 and held for rotation with respect thereto is a locking sleeve 40 provided with inwardly extending lugs 41 adapted to cooperate with lugs 42 (FIG. 8) in the periphery of the breech plate 34. Locking sleeve 40 is likewise provided with inwardly extending lugs 43 adapted to pass through slots 44 (FIG. 9) between lugs 45 on the periphery of frame plate 11. It is thus apparent that, breech plate 34, chamber plate 28 and frame plate 11 being in alignment, springs 31 and 36 act to move them into facial engagement, as shown in FIGS. 1 and 3. In this breech closed condition, rotation of the locking sleeve 40 engages its lugs 43 in front of the frame plate lugs 45 and its lugs 41 behind breech plate lugs 42, securely locking the breech.

To open the breech for reloading, locking sleeve 40 must first be rotated to disengage lugs 43 from the lugs 45 on the frame plate 11. The locking sleeve, breech plate and chamber plate are then retracted to the relative longitudinal positions shown in FIG. 2, compressing springs 31 and 36. Hinge pin 30 moves axially rearward, sliding through frame plate 11 and its boss 111. Chamber plate 28 moves rearwardly with the hinge pin until spring 31 is substantially fully compressed, at which time chamber bushing 27 has cleared the end of barrel 10 and detent pin 39 has cleared the cylindrical portion of aperture 39*a*. Concurrently with the rearward movement of hinge pin 30, the breech plate 34 slides rearwardly on the hinge pin until spring 36 is substantially fully compressed, at which time the end of detent pin 391 has cleared the cylindrical portion of aperture 391*a*. The three elements, frame plate 11, chamber plate 28 and breech plate 34, are now free for relative rotation about the hinge pin 30 to swing completely into the position shown in FIG. 2.

To the breech plate 34 is secured by suitable means such as bolts 60 a housing 58 having attached thereto or integral therewith a handle 59. These elements, with the contents of the housing (to be described), constitute the rear or breech assembly. It will be understood that this rear assembly moves both axially and transversely as a unit and relative to the front assembly comprising frame plate 11, cover 12, etc. In the initial rotary movement of the rear assembly, the forward end of detent pin 39 traverses a short arcuate cut-out 39b (FIG. 9) in the face of the frame plate 11, said cut-out communicating at one end with aperture 39*a* and at the opposite end with a recess 39*c* in which the detent 39 comes to rest, limiting the rotation of the chamber plate 28 and locating it in the angular position shown in FIG. 4. The rear end of detent pin 391 traverse a cut-out 391*b* (FIG. 8) in the breech plate 34, which cut-out communicates with the aperture 391*a* and with a recess 391*c* which limits the rotation of the rear assembly. The relative angular positions of the barrel assembly, chamber plate and rear assembly, when the tool is thus opened for reloading, are clearly shown in FIG. 4. The chamber bushing 27 is accessible from both ends, as seen in FIG. 2.

Assuming that a cartridge has been fired and the breech opened in the described manner, the chamber bushing will contain the fired shell. The means for removing such fired shell may comprise an ejector rod 50 (FIG. 3) mounted within the cover 12 for longitudinal movement and urged forwardly within said cover by suitable means, such as a spring 51. A lug 52 (FIGS. 3 and 7) extends laterally from ejector rod 50 and comprises a threaded aperture adapted to receive a screw 53 by which the ejector assembly is secured to an operating sleeve 54 surrounding the cover 12, said cover being longitudinally slotted to receive the shank of screw 53 and enable longitudinal movement of the ejector assembly. The placement of the ejector rod in cover 12 is such that when the chamber plate is rotated to its open position, as above described, the rod is in line with the chamber bushing and the shell therein; hence, the parts being so positioned, a rearward movement of the ejector rod serves to eject the fired shell. A fresh cartridge can then be inserted in the chamber and the breech closed by reversely rotating the breech plate and the chamber plate, to bring them into alignment with the frame plate and barrel, permitting the parts to move into closed relationship under the stress of springs 31 and 36, then rotating the locking sleeve 40 to locked position, as above described.

In the foregoing description, rotation of the breech plate 34 about hinge pin 30 will be understood as including rotation of the rear housing and the handle. It will also be understood that not only the chamber bushing 27 but also the barrel 10 can be readily removed and replaced when desired. This enables the use of a single tool for interchangeably driving studs of different maximum diameters with varying amounts of power, the stud to be driven being dropped into the breech end of the barrel when the breech is open, and retained therein by suitable means. All that is necessary to replace the barrel is to unscrew the barrel in use from the frame plate 11 and replace it with a barrel of the desired bore size or other characteristics. Barrels being readily interchangeable, it is desired to provide means for insuring that a barrel is properly and fully threaded into the frame plate. The means illustrated for this purpose comprises a counterbored radial aperture in the frame plate adapted to receive a pin 55 (FIG. 3) urged radially inward by spring 56 held in place by a screw 57 which is apertured to receive the body of the cylindrical pin. The rounded nose of pin 55 is received in an annular groove 101 near the base of the threads on the barrel 10. If the barrel is not fully threaded into the frame plate, the nose of the pin rides on the threads and its outer end projects outwardly into the path of movement of one of the locking lugs 43 on the locking sleeve 40.

The fire control mechanism is preferably of the type in which the striker is cocked by adequate pressure of the tool against the work face and is released for firing movement under these conditions by manipulation of a trigger. A fire control mechanism of this type is shown in the prior co-pending application of Walker, Serial No. 359,794, filed June 5, 1953, and issued as U.S. Letters Patent No. 2,719,300 on October 4, 1955. As applied to the tool of the present invention, it may be constructed as follows:

The striker, FIGS. 1 and 10, identified generally by numeral 61, is provided with a firing pin or point of reduced diameter so located as to properly impact the priming mixture-containing portion of a cartridge in the chamber 27. To the rear of the firing point, the striker comprises a section 62 having guiding engagement in an aperture in the breech plate, a section of further increased diameter 63, and a section of maximum diameter 64 terminating in a forwardly facing shoulder 65. The striker also comprises a rearwardly extending shank or pilot 66 receiving a striker spring 67, the rear end of the pilot 66 entering a socket abutment 68 secured to the rear end of housing 58. The striker is thus guided for reciprocating movement along its longitudinal axis by the socket 68 and by the reception of the portion 62 in the apertured breech plate. An action bar extension 70, FIGS. 1 and 10, the forward portion of which is received in an aperture in the breech plate 34, is supported in alignment with aforementioned action bar 26 (FIG. 2). When action bar 26 is supported by barrel sleeve 13 in contact with the work, and the tool is pressed downward toward the work, frame plate 11, chamber plate 28, and breech plate 34 move downwardly, and action bar 26 passes through the aligned apertures in the plates into supporting engagement with the action bar extension 70 which has its forward portion disposed in the aperture of breech plate 34. Continued downward movement of the tool results in a relative rearward displacement of action bar extension 70 within the advancing housing. The rear end 71 (FIGS. 1 and 10) of the action bar extension is received in a socket 72 in the housing, where it abuts a spring-pressed plunger 73, having the effect of restoring it to forward position in the housing when it is freed for such movement by retraction of the housing relative to action bar 26. Secured to the action bar extension and projecting transversely therefrom is a two-armed sear 74 (FIGS. 1, 6, 10, and 10*a*) having a part 75 which is normally in alignment with the forwardly facing shoulder 65 of the striker, the action bar extension assembly being urged to rotatably move said part 75 into the path of movement of said shoulder 65 on the striker by suitable means such as a spring 77, said spring having a longitudinally extending portion received in an aperture or notch 78 in the sear 74 to enable longitudinal movement of the sear. When the tool housing is moved forwardly relative to the supported sear 74 with the action bar 26 and action bar extension 70, the nose 79 on the sear is brought into the path of movement of a sear lever 80 pivoted at 81 in the housing 58 and provided with a transversely extending arm 82 the end portion of which occupies a notch in a rectilinearly moving trigger bar 83 provided with a finger-piece 84 and urged to forward or ineffective position by suitable means such as spring 85. Thus, with the action bar extension assembly, including the sear 74, being disposed in its rearmost position in the housing by adequate pressure of the tool against the work, manipulation of the trigger rocks the sear and displaces the shoulder 75 transversely to disengage it from the shoulder 65 of the striker, permitting firing movement of the striker under the thrust of the striker spring 67. This can take place when and only when the tool is properly pressed against the work.

Means are provided for insuring that the firing point of the striker cannot reach the cartridge head unless the action is securely locked by complete rotation of the locking sleeve 40 in its locking position. This means may comprise a segmental plate 86 (FIGS. 1, 5, and 10) pivoted to the breech plate 34 at 87 and provided with an outwardly extending finger 88 received in an aperture 89 in the locking sleeve 40. An arcuate slot 90 in said plate receives a part 62 of the striker, and the portion 861 of plate 86 adjacent most of the length of the slot is rearwardly displaced to form an abutment which engages shoulder 621 on the striker and stops forward movement of the striker before it has impacted the cartridge. Thus, it is only when said plate is in a position corresponding to the breech locking position of the locking sleeve that the striker is permitted to move far enough forward to fire a cartridge.

An optional safety feature is provided which requires that the locking sleeve be manually held in fully locked position. This feature is shown disabled in FIG. 5, but when it is effective, firing of the tool requires that the operator have one hand on the handle, where he can pull the trigger, and the other hand on the locking sleeve, as well as having the tool firmly pressed against the work. This is deemed desirable in certain conditions and uses of the tool, while under other circumstances it is unnecessary. The optional means for this purpose may be constructed as follows:

A spring 91 (FIG. 5) is suitably mounted on the rear face of the breech plate 34 as at 87 and biased so that the end portion thereof, shown hooked on the disabling pin 93, tends to engage the margin of the sector shaped plate 86, urging this plate and with it the locking sleeve 40 counterclockwise, when viewed as in FIG. 5, into partially locked position in which firing movement of the striker is blocked, as above described. The spring being effective, it is necessary for the operator to hold the locking sleeve in fully locked or the farthest clockwise position permitted in order to fire, for only in this position does the raised portion 861 on the sector plate 86 permit full movement of the striker. If such "two hand operation" is not desired, it may be dispensed with by withdrawing the terminal portion of spring 91 from contact with the margin of sector plate 86 and holding it as shown in FIG. 5 on a pin 93 secured in and projecting rearward from the breech plate 34 and adapted to receive the looped end of the spring. Rotation of the locking sleeve 40 relative to the breech plate may be limited by the engagement of a stud on the breech plate in an arcuate slot 95 in the plate 86. With the spring disabled in this way the locking sleeve 40 may be turned manually to its fully locked position as an incident to loading the tool and will be there frictionally retained.

An additional safeguard against firing unless the breech is fully locked may be provided by extending a nose 96 (FIGS. 1, 3, and 10) projecting outwardly from the trigger bar into a circumferential slot 97 in the locking sleeve 40. The body of this slot is of such width as to prevent longitudinal movement of the nose and hence the trigger, but a terminal portion 98 thereof is widened to such an extent as to enable sear actuating movement of the trigger. Only when the locking sleeve 40 has been turned to its fully locked position is the terminal portion 98 of the slot in such position relative to the trigger nose 96 as to permit firing movement thereof.

There has been described above a particularly effective arrangement for so displacing a breech block and a chamber bushing with respect to a barrel as to provide access to both the barrel (for placing therein a stud or other device to be driven) and the chamber bushing (for the ejection of a fired shell and the insertion of a fresh cartridge) while maintaining the parts in a unitary and integrated assembly, as distinguished from complete separation. Various modifications of the breech mechanism accomplishing the same objects are illustrated somewhat diagrammatically in FIGS. 11 to 28, inclusive, and described as follows:

In the arrangement illustrated in FIGS. 11, 12 and 13, the breech plate 401 is secured to a longitudinally movable pivot pin 402 received in an elongated aperture comprising slots 403 in frame plate 404. The pivot pin is provided with lugs 405 which when rotated to engage the front face 406 of frame plate 404 serve to lock the breech closed, as shown in FIG. 11. The chamber plate 407 is apertured to pass the pivot pin 402 and is so counterbored that lugs 405 serve as a means for rotating the plate 407 during a part of the rotation of the pivot pin. The breech being locked, as shown in FIG. 11, the rear assembly, comprising breech plate 401, is first rotated to disengage lugs 405 from the back of frame plate 404 and align the lugs with slots 403. The rear assembly is then retracted to the position shown in FIG. 12, at which point lugs 405 pick up the chamber plate 407, withdrawing the chamber bushing 408 from barrel 409. Rearward movement of the rear assembly continues until the head 410 of pivot pin 402 engages the back of frame plate 404. The pivot pin is then further rotated, to enable the margin of breech plate 401 to clear the mouth of the chamber bushing, as shown in FIG. 13.

In the modifications shown in FIGS. 14 to 18, the pivot pin 501 carries breech locking lugs 502 adapted to engage the front face of frame plate 503 and to pass through apertures 504 therein when the pivot pin has been suitably rotated about its axis. Breech plate 505 and chamber plate 506 are both splined on pivot pin 501. The chamber plate comprises an arcuate slot 507 centered on pivot pin 501 which receives the chamber bushing 508. A rotation lock may be provided, as indicated at 509. The forward end 510 of pivot pin 501 is joined to the remainder of the pin by a hinge 511. The closed and locked position of the breech mechanism is shown in FIG. 14. The rotation lock 509 being disabled, the pivot pin 501 and parts associated therewith are rotated about 90°, to align lugs 502 with slots 504, as shown in FIG. 16. The chamber bushing is now located in the opposite end of the slot 507, making it accessible, as shown in FIG. 17. The breech assembly mounted on pivot pin 501 is now retracted to the dotted line position shown in FIG. 18, in which the hinge 511 has passed through and cleared the frame plate 503. The breech assembly is now rotated about hinge 511 to the position shown in full lines in FIG. 18, affording complete access to the breech end of barrel 512.

The modification shown in FIGS. 19, 20 and 21, contemplates T-slot connections between the frame and the chamber plate and between the chamber plate and the breech plate, and the chamber plate is of sufficient depth to contain the chamber bushing, so that longitudinal movement of the chamber plate with respect to the frame plate and barrel is unnecessary. The frame plate 601, into which the barrel 602 is threaded in the usual manner, comprises a T-slot 603 adapted to receive a T-head 604 on the chamber plate 605 in which is mounted chamber bushing 606. Chamber plate 605 comprises a T-slot 607 which receives a T-head 608 on breech plate 609. In FIGS. 19 and 21 the breech is shown open, the chamber plate 605 having been moved transversely in T-slot 603, to clear the barrel mouth, and the breech plate 609 having been moved transversely in T-slot 607, to clear the chamber bushing. Access to both barrel and chamber bushing is thus provided.

FIGS. 22, 23 and 24 illustrate a structure in which the breech plate 701 is provided with a longitudinally extending foot 702 and the chamber plate 703 is provided with a longitudinally extending foot 704. Both plates are supported on a pivot pin 705 in the lower part of frame plate 706. A pin 707 extending transversely from foot 702 is received in a slot 708 in the chamber plate. FIG. 22 shows the breech closed. To open, the rear assembly comprising breech plate 701 is moved about pivot 705 to the FIG. 23 position, the pin 707 traversing the slot 708. Further pivotal movement displaces the chamber plate 703 to the FIG. 24 position, in which both the chamber bushing 709 and the rear end of barrel 710 are accessible. Sufficient clearance between the chamber bushing recess 711 and the chamber bushing 709 is provided to permit the required angular movement of chamber bushing 709 as it is withdrawn from the recess. Obviously, any convenient means may be provided to releasably lock to each other, at the side diametrically opposite the pivot pin 705, the breech plate 701 and frame plate 706 when these plates are in the position shown in FIG. 22.

In the modification shown in FIGS. 25 and 26, the chamber plate 801 is of sufficient thickness to receive substantially the full length of chamber bushing 802. The extreme forward end of the bushing may enter a shallow recess in the barrel, from which it is withdrawn by suitable means to enable rotation of the chamber plate relative to the barrel without preliminary longitudinal movement. The chamber plate 801 is pivoted to frame plate 803 on pivot pin 804. The breech plate 805 is pivoted at 806 to a bracket 807 extending from the chamber plate. The breech locking means may comprise a rod 808 slidably received in an aperture in breech plate 805 and provided with interrupted threads or lugs 809 adapted for locking engagement with counterpart members 810 in an aperture in frame plate 803. A cut-out 811 in chamber plate 801 enables the clearing of the mouth of barrel 812 after a minimum rotation of chamber plate 801 about pivot 804. FIG. 25 shows the mechanism in unlocked and partially open position, and FIG. 26 shows the breech fully open.

FIGS. 27 and 28 show a construction embodying some of the features of the modifications shown in FIGS. 19, 20 and 21, and some of the features of the construction shown in FIGS. 25 and 26. The chamber plate 901, which is of sufficient depth to contain the length of chamber bushing 902, is pivoted to frame plate 903 on longitudinally extending pivot pin 904. The breech plate 905 has a T-slot connection 906 with the chamber plate, which plate is provided with a cut-out 907 to facilitate clearing the mouth of the barrel. FIG. 27 shows the breech partially open, and FIG. 28 shows it fully open.

Within the scope of the appended claims are other variations in the typical breech and other constructions which have been described.

What is claimed is:

1. A powder actuated tool comprising a barrel assembly having a barrel and a breech end, a breech plate assembly, a chamber plate positioned between the barrel assembly and the breech plate assembly, a bushing having a cartridge receiving chamber mounted in said chamber plate, and means permanently joining said barrel assembly and said breech assembly to said chamber plate in an integrated unit, said joining means comprising a coupling element mounting said barrel assembly, said chamber plate and said breech plate assembly for relative movement with at least one of said assemblies being reciprocable relative to said chamber plate and at least one of said assemblies being rotatable relative to said chamber plate from a breech closed position in which said assemblies are in alignment and in which the chamber plate is sandwiched between said assemblies with the cartridge receiving chamber communicating at one end with said barrel and closed at the other end by said breech plate assembly to a breech open position giving access to the breech end of the barrel without obstruction by said chamber plate, said bushing, or said breech plate assembly and giving access to said chamber without obstruction by said breech plate assembly or said barrel assembly.

2. A tool according to claim 1, in which said joining means comprises an elongated coupling element mounting said chamber plate intermediate its ends, a frame plate secured to the breech end of the barrel in said barrel assembly and engaged with one end of said coupling element, and support means on said breech plate assembly engaged with the opposite end of said coupling element, at least one of said barrel assembly and said breech plate assembly being mounted on said coupling element for rotation and translation relative thereto,, said coupling element retaining said plate members in assembled relationship but with freedom for limited movement with respect to each other in respect to both reciprocation and rotation.

3. A tool according to claim 2, in which said barrel assembly comprises a fire controlling action bar and means for projecting the rear portion of said action bar into said breech plate assembly when said assemblies are in breech closed position, and said breech plate assembly comprises an action bar extension adapted for rearward displacement by said action bar, a sear carried by and movable bodily with said action bar extension, a spring-urged striker comprising a shoulder normally engaged by said sear and cocked by the bodily rearward movement of said sear, and trigger operated means adapted to rotate said action bar extension and said sear to disengage said sear from said striker shoulder and free the striker for spring-urged movement.

4. A tool according to claim 3, in which the barrel assembly frame plate is provided with locking lugs and said breech plate assembly comprises a breech plate and a locking sleeve rotatable about the axis of the breech plate, said sleeve being provided with lugs engaging the breech plate and with other lugs adapted to engage said frame plate lugs to lock the breech closed when the locking sleeve is rotated to locking position, a shoulder on said striker, and a safety member rotating with said locking sleeve adapted to block firing movement of said striker when said locking sleeve is not in breech locked position.

5. A tool according to claim 4, comprising an interlock between said sleeve and said trigger adapted to block striker releasing movement of said trigger when said locking sleeve is not in breech locked position.

6. A tool according to claim 5, comprising spring means biased to urge said locking sleeve away from breech locking position, into a position to block striker releasing movement of the trigger and to simultaneously position said safety member to block firing movement of said striker, thereby requiring deliberate manual movement into and holding of said locking sleeve in breech locked position to permit firing.

7. A tool according to claim 6, in which said spring means is mounted on said breech plate and laterally engages said safety member rotating with said locking sleeve, there being on said breech plate an element to which said spring means may be secured and adapted to hold the portion of said spring normally engaging said safety member, thereby freeing the locking sleeve from the bias of said spring and permitting firing without manually holding the locking sleeve in breech locked position.

8. A tool according to claim 1, in which said chamber bushing projects forwardly from said chamber plate and said barrel is counterbored to receive the projecting part of said chamber bushing.

9. A tool according to claim 1, in which said barrel assembly comprises a frame plate secured to the breech end of the barrel and in which said coupling element comprises a pivot pin received in aligned apertures in said frame plate, said chamber plate and said breech plate assembly and retaining said plates in assembled, but relatively movable relationship.

10. A tool according to claim 9, in which said chamber plate is secured to said pivot pin, and in which said frame plate and breech plate assembly respectively comprise bosses providing elongated bearing surfaces for said pivot pin, said bosses being slidable on said pivot pin to enable longitudinal movement of said breech plate assembly and frame plate relative to said chamber plate, said frame plate and breech plate assembly being also rotatable on said pivot pin to enable rotational displacement of said frame plate and breech plate assembly relative to said chamber plate.

11. A tool according to claim 10, comprising spring means urging said frame plate and said breech plate assembly longitudinally into facial engagement with said chamber plate in breech closing position.

12. A tool according to claim 11, in which said spring means comprises coil springs surrounding said pivot pin and compressed between the ends of said bosses and abutments adjacent the ends of said pivot pin.

13. A tool according to claim 12, comprising a locking sleeve surrounding said breech plate and mounted for rotation relative thereto, and interengaging locking means on said sleeve and said breech plate and frame plate respectively whereby, when said breech plate, chamber plate and frame plate are in alignment and in facial engagement, rotation of said sleeve relative to said plates locks said members in breech closed position.

14. Plate position controlling means according to claim 13, comprising a detent pin secured to and extending rearwardly from said chamber plate, there being in said breech plate an aperture adapted to receive said detent pin when said breech plate is in breech closing alignment with said chamber plate, said detent pin holding said breech plate longitudinally spaced from said chamber plate in other relative angular positions of said breech plate and chamber plate.

15. Plate position controlling means according to claim 14, in which said breech plate comprises an arcuate slot adapted to receive the end of said detent pin.

16. In a tool including a frame plate secured to the breech end of a counterbored barrel, a chamber plate supporting a chamber bushing to be received in the counterbored barrel, a breech plate, and pivot means rigidly secured to said chamber plate and securing said three plates in assembled relation but with freedom to be rotated relative to each other and to be separated from each other along the longitudinal axis of said pivot means, plate position controlling means in which a detent pin projects forwardly from said chamber plate, there being in said frame plate an aperture adapted to receive said detent pin when said chamber bushing is in alignment with said barrel counter-bore, said detent holding said chamber plate longitudinally spaced from said frame plate in other relative angular positions of said frame plate and chamber plate.

17. Plate position controlling means according to claim 16, in which said frame plate comprises an arcuate recess communicating with said aperture and adapted to receive the end of said detent pin and limit the angular movement of said chamber plate relative to said frame plate.

18. Plate position controlling means according to claim 17, comprising an ejector rod mounted for longitudinal rearward movement through said frame plate in alignment with the position of said chamber bushing as determined by the engagement of said detent with the end of said arcuate recess.

19. Plate position controlling means according to claim 18, comprising a cover, means for securing said cover to the peripheral portion of said frame plate, and an ejector operating element secured to said ejector rod and mounted upon and for movement relative to said cover.

20. Plate position controlling means according to claim 19, comprising spring means normally holding said ejector rod in ineffective position forward of the rearward face of said frame plate.

21. An explosively actuated tool for driving a fastener and the like comprising a barrel and breech closure means interengageable with said barrel and arranged with said barrel to carry an explosive power cartridge and apply its force operatively to said barrel, a barrel and closure means supporting housing mounted externally of said barrel, said housing having front and rear portions, said closure means being carried in said rear housing portion, and means mounted on the barrel intermediate the ends of said barrel and abuttable with a part of said housing for receiving and transmitting a thrust recoil force from the barrel upon firing of the tool to the front portion of the housing forwardly of the breech of said barrel and closure means arrangement.

References Cited in the file of this patent

UNITED STATES PATENTS

| | | |
|---|---|---|
| 187,980 | Moore | Mar. 6, 1877 |
| 2,221,157 | Temple | Nov. 12, 1940 |
| 2,470,117 | Temple | May 17, 1949 |
| 2,518,395 | Sopris | Aug. 8, 1950 |
| 2,549,993 | Temple | Apr. 24, 1951 |
| 2,645,772 | Walker | July 21, 1953 |
| 2,700,764 | Catlin et al. | Feb. 1, 1955 |
| 2,790,174 | Magnuson | Apr. 30, 1957 |
| 2,799,108 | Kopf et al. | July 16, 1957 |
| 2,945,236 | Kopf et al. | July 19, 1960 |